United States Patent
Takeuchi et al.

(10) Patent No.: US 7,226,695 B2
(45) Date of Patent: Jun. 5, 2007

(54) METHOD FOR PRODUCING COMPOSITE MATERIAL FOR ELECTRODE COMPRISING QUINOXALINE BASED POLYMER, SUCH MATERIAL, ELECTRODE AND BATTERY USING THE SAME

(75) Inventors: Masataka Takeuchi, Chiba (JP); Hiroshi Yasuda, Chiba (JP); Junko Mizuguchi, Chiba (JP)

(73) Assignee: Showa Denko K.K., Tokyo (JP)

( * ) Notice: Subject to any disclaimer, the term of this patent is extended or adjusted under 35 U.S.C. 154(b) by 515 days.

(21) Appl. No.: 10/479,486

(22) PCT Filed: Jun. 11, 2002

(86) PCT No.: PCT/JP02/05784

§ 371 (c)(1),
(2), (4) Date: Dec. 3, 2003

(87) PCT Pub. No.: WO02/103825

PCT Pub. Date: Dec. 27, 2002

(65) Prior Publication Data

US 2004/0185342 A1    Sep. 23, 2004

Related U.S. Application Data

(60) Provisional application No. 60/298,880, filed on Jun. 19, 2001, provisional application No. 60/298,881, filed on Jun. 19, 2001, provisional application No. 60/298,894, filed on Jun. 19, 2001.

(30) Foreign Application Priority Data

| Jun. 14, 2001 | (JP) | ............................ 2001-180067 |
| Jun. 14, 2001 | (JP) | ............................ 2001-180068 |
| Jun. 14, 2001 | (JP) | ............................ 2001-180069 |
| Apr. 26, 2002 | (JP) | ............................ 2002-126434 |

(51) Int. Cl.
*H01M 4/02* (2006.01)
(52) U.S. Cl. .................. 429/209; 429/213; 429/218.1; 427/485; 427/486
(58) Field of Classification Search ................ 429/209, 429/213, 218.1; 427/485, 486
See application file for complete search history.

(56) References Cited

U.S. PATENT DOCUMENTS 3,864,310 A    2/1975   Saferstein (Continued)

FOREIGN PATENT DOCUMENTS

EP    0 911 893    4/1999

(Continued)

OTHER PUBLICATIONS

International Search Report for PCT/JP02/05784 dated Sep. 26, 2002.

*Primary Examiner*—Patrick Joseph Ryan
*Assistant Examiner*—Jane Rhee
(74) *Attorney, Agent, or Firm*—Sughrue Mion, PLLC

(57) ABSTRACT

The present invention relates to a method for producing a polymer/conductive carbon composite electrode comprising dehydration condensation polymerization of a tetramine derivative and a tetracarbonyl compound in the presence of an electrically conductive carbon material. The synthetized polymer comprises quinoxaline structural units such as polyphenyl quinoxaline (PPQ) and serves as an active material having proton conductivity. The composite material for electrode obtained by the method has a large capacity of inserting/releasing a proton and excellent in durability. An electrode comprising the composite material and a secondary battery comprising the electrode is excellent in safety and reliability high-speed current characteristics, has a longer life and a larger gravimetric energy density (Wh/kg).

38 Claims, 1 Drawing Sheet

U.S. PATENT DOCUMENTS

| | | |
|---|---|---|
| 4,064,176 A | 12/1977 | Rabilloud et al. |
| 4,768,130 A | 8/1988 | Bernard et al. |
| 6,248,474 B1 | 6/2001 | Nishiyama et al. |
| 6,274,268 B1 | 8/2001 | Fujiwara et al. |
| 6,509,116 B1 * | 1/2003 | Kaneko et al. ............. 429/213 |
| 2003/0134201 A1 * | 7/2003 | Sato et al. ............... 429/231.8 |

FOREIGN PATENT DOCUMENTS

| | | | |
|---|---|---|---|
| EP | 0971426 | A2 | 1/2000 |
| EP | 1035603 | A1 | 9/2000 |
| EP | 1091434 | A1 | 4/2001 |
| EP | 1202372 | A2 | 5/2002 |
| EP | 1204156 | A2 | 5/2002 |
| JP | 62-108459 | | 5/1987 |
| JP | 10-289617 | | 10/1998 |
| JP | 11-126610 | | 5/1999 |
| JP | 2000-260422 | | 9/2000 |
| JP | 2000-260423 | | 9/2000 |

* cited by examiner

METHOD FOR PRODUCING COMPOSITE MATERIAL FOR ELECTRODE COMPRISING QUINOXALINE BASED POLYMER, SUCH MATERIAL, ELECTRODE AND BATTERY USING THE SAME

CROSS-REFERENCE TO RELATED APPLICATIONS

This application is based on the provisions of 35 U.S.C. Article 111(a) with claiming the benefit of filing dates of U.S. provisional application Ser. No. 60/298,880 filed on Jun. 19, 2001, U.S. provisional application Ser. No. 60/298,881 filed on Jun. 19, 2001 and U.S. provisional application Ser. No. 60/298,894 filed on Jun. 19, 2001 under the provisions of 35 U.S.C. 111(b), pursuant to 35 U.S.C. Article 119(e)(1).

TECHNICAL FIELD

The present invention relates to a method for producing a composite material for electrode comprising polymer containing a quinoxaline structural unit, the composite material for electrode obtained by the method, an electrode produced by using the composite material for electrode, a method for producing the electrode and a battery comprising the electrode.

More specifically, the present invention relates to a method for producing a composite material for electrode which comprises an electrically conductive carbon material and polymer containing a quinoxaline structural unit which has suitable properties to be employed in a proton migration type battery, the composite material for electrode obtained by the method, an electrode produced by using the composite material for electrode, a production method of the electrode and a battery comprising the electrode which is excellent in safety, reliability and high-speed current characteristics and has a long cycle life and a large gravimetric energy density.

BACKGROUND ART

Recent new-type secondary batteries such as nickel/hydride battery and Li ion secondary battery are characterized by the high energy density and because of this characteristic, these are used by mounting it on a small-size portable equipment and abruptly making a drastic growth in recent years. Particularly, the Li ion battery is predominating in the secondary batteries because the instrument using this battery can be more reduced in the weight, size and thickness.

A large number of studies are being made, for example, on a lithium ion battery using an organic electrolytic solution, where a metal oxide or a metal sulfide, such as $LiCoO_2$, $LiNiO_2$, $LiMn_2O_4$ or $MOS_2$, is used for the positive electrode and lithium, a lithium alloy or a carbon material or inorganic compound capable of occluding/releasing lithium ion is used for the negative electrode. A lithium battery using $LiMn_2O_4$ or $LiNiO_2$ for the positive electrode is reported in *J. Electrochem, Soc.*, Vol. 138, No. 3, page 665 (1991).

Also, there are many reports on batteries using an electrically conductive polymer as an electroactive material. For example, a lithium secondary battery using a polyaniline for the positive electrode is commercially available as a coin-type battery for backup power sources. It is also reported that polyaniline can be oxidized/reduced by a proton and is applicable as a positive electrode active material of a battery using an acidic aqueous solution (see, e.g., *Bull. Chem. Soc. Jpn.*, 57, page 2254 (1984)).

However, these lithium batteries have a problem in the safety and reliability in the case of short circuiting, high temperature, liquid leakage and unsealing because lithium and/or a lithium-base compound used therein is active to water or air and is oxidized easily. Therefore, various methods for improving the safety are employed, such as an improvement of the separator, incorporation of a PTC element or sealing.

For the purpose of improving the safety, high-speed current characteristics and the like which are defects of the above-described new-type batteries such as lithium ion battery, the present inventors have previously proposed a proton migration type secondary battery excellent in safety, reliability and current characteristics and having a long life and a high capacity (JP-A-10-289617 (the term "JP-A" as used herein means an "unexamined published Japanese patent application")). The electroactive material used in this proton migration type secondary battery is a polypyridine series and/or polypyrimidine series polymer, a sulfonic acid side chain series and/or hydroquinone series polymer, a manganese oxide and the like.

These electroactive materials are facilitated in the insertion/release of a proton and therefore, a secondary battery excellent in the safety and high-speed current characteristics can be obtained. However, a secondary battery thus obtained has much room for further improvement in its capacity for the insertion/release of a proton and the energy density greatly inferior to conventional new-type batteries.

*J. Electrochem. Soc.*, Vol. 145, No. 4, page 1193 (1998) has reported that polyphenylquinoxaline exhibits an oxidation-reduction reaction in an acid aqueous solution.

European Patent Publication EP1035603A1 and JP-A-2000-260423 have proposed an electrode using a quinoxaline-base resin compounded with a specific sulfonic acid and applications thereof to a battery and a capacitor. Polymer having a quinoxaline structural unit, for its properties, is much more expected to contribute to improvement of the capacity as compared with conventionally used polypyridine or polyaniline.

Furthermore, JP-A-2000-30710 (U.S. Pat. No. 6,274,268) has proposed, as a means to enhance the capacity, a polymer battery where a polymer-carbon composite composition obtained by coating the surface of powdery carbon with an organic compound polymer capable of electrochemically adsorbing/desorbing a proton, such as polyaniline or polypyridine, is used as an electroactive material.

In JP-A-2001-110423 (EP 1091434A1), the present inventors have proposed use of a polymer having a quinoxaline structural unit, such as polyphenylquinoxaline for an electrode material of a proton migration type battery and a composite electrode using such a polymer with an electrically conductive carbon material, which has considerably improved the capacity, however, the improvement is not sufficient to put such a battery to practical use. Moreover, though a composite material of the polymer and an electrically conductive carbon material is preferable for an electrode in terms of the conductivity, studies on the methods did not go into details and the Examples only disclosed methods for mixing a polymer having quinoxaline structural unit and an electrically conductive carbon material. In addition, a problem that the amount of the electrically conductive carbon material required is comparably large, was left unsolved.

DISCLOSURE OF THE INVENTION

An object of the present invention is to provide a method for producing a composite material for electrode having characteristics suitable for a proton migration type battery and the composite material for electrode produced by the method. Another object of the present invention includes providing an electrode using the composite material for electrode and a battery and/or a proton migration type second battery using the electrode, which is excellent in safety, reliability and high-speed current characteristics and has a long life and a high capacity.

As a result of extensive investigations to solve the above-described problems, the present inventors have found that the composite material containing a polymer having a quinoxaline structural unit on the surface of an electrically conductive carbon material, which is obtained by a production method where a tetramine derivative and a tetracabonyl compound are subjected to dehydration condensation polymerization in the presence of an electrically conductive carbon material, has a larger capacity of inserting/releasing a proton and better durability as compared with conventional composite materials for electrode obtained by mixing a polymer having a quinoxaline structural unit and an electrically conductive carbon material, and have achieved the present invention.

The present inventors have also found that an electrode using this composite material for electrode obtained by the method and a battery using the electrode are excellent in safety, reliability and high-speed current characteristics and further that a secondary battery having a longer life and a larger gravimetric energy density (Wh/kg) as compared with conventional aqueous solution-type double-layer capacitors or lead storage batteries using a sulfuric acid can be manufactured with the electrode using the composite material, and have accomplished the present invention.

Specifically, the present invention (I) provides a method for producing a composite material for electrode containing a polymer having a quinoxaline structural unit represented by formula (1):

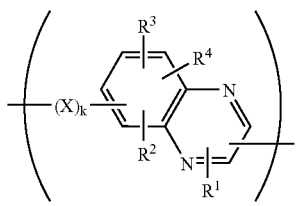

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5), comprising dehydration condensation polymerization of a tetramine derivative having two o-diaminophenyl groups and a tetracarbonyl compound having two α,β-dicarbonyl groups in the presence of an electrically conductive carbon material.

The present invention (II) provides a composite material for electrode containing a polymer having a quinoxaline structural unit represented by formula (1) on the surface of an electrically conductive material, obtained by the method of the present invention (I).

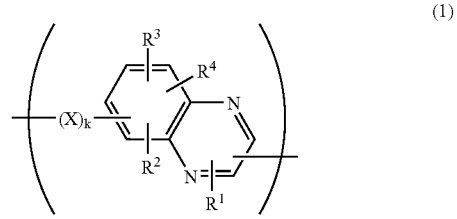

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5).

Further, the present invention (III) provides an electrode comprising the composite material for electrode of the present invention (II).

Furthermore, the present invention (IV) provides a production method of the electrode of the present invention (III).

Still further, the present invention (V) provides a battery comprising the electrode of the present invention (III).

More specifically, the present invention provides:

1) a method for producing a composite material for electrode containing a polymer having a quinoxaline structural unit represented by formula (1):

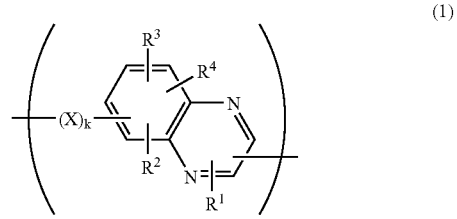

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) on the surface of an electrically conductive carbon material, comprising dehydration condensation polymerization of a tetramine derivative having two o-diaminophenyl groups and a tetracarbonyl compound having two α,β-dicarbonyl groups in the presence of an electrically conductive carbon material;

2) the method for producing the composite material for electrode as described in 1) above, wherein the electrically conductive carbon material is at least one selected from the group consisting of carbon black, activated carbon, carbon fiber and graphite;

3) the method for producing the composite material for electrode as described in 1) or 2) above, wherein the conductivity of the electrically conductive carbon material at 20 to 30° C. is 0.1 S/cm or more;

4) the method for producing the composite material for electrode as described in any one of 1) to 3) above, wherein the BET specific surface area of the electrically conductive carbon material is within a range of 50 to 5,000 m²/g;

5) the method for producing the composite material for electrode as described in any one of 1) to 4) above, wherein the average particle size of the electrically conductive carbon material is within a range of 0.5 to 30 μm.

6) the method for producing the composite material for electrode as described in any one of 1) to 5) above, wherein the electrically conductive carbon material contains a fibrous carbon material having an aspect ratio of 5 or more at a concentration of 1 to 40 weight %, 7) the method for producing the composite material for electrode as described in 6) above, wherein the electrically conductive carbon material which is a vapor phase grown carbon fiber or a carbon nanotube and has a fiber size (diameter) of 1 μm or less;

8) the method for producing the composite material for electrode as described in any one of 1) to 7) above, wherein the tetramine derivative having two o-diaminophenyl groups is a tetramine derivative represented by formula (2)

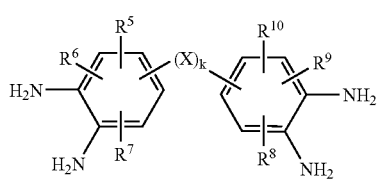

(wherein $R^5$ to $R^{10}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^5$ to $R^{10}$ each may have a linear, branched or cyclic structure; X represents a heteroatom alone or an aryl group having from 2 to 20 carbon atoms which may have a heteroatom; and k represents an integer of 0 to 5);

9) the method for producing the composite material for electrode as described in any one of 1) to 8) above, wherein the tetramine derivative represented by formula (2) is at least one selected from the group consiting of 3,3'-diaminobenzidine, 3,3',4,4'-tetraaminodiphenyl ether, and a halogen, alkyl, alkoxy or nitro group substitution product thereof;

10) the method for producing the composite material for electrode as described in any one of 1) to 9) above, wherein the tetracarbonyl compound having two α,β-dicarbonyl groups is a bisbenzyl derivative represented by formula (3):

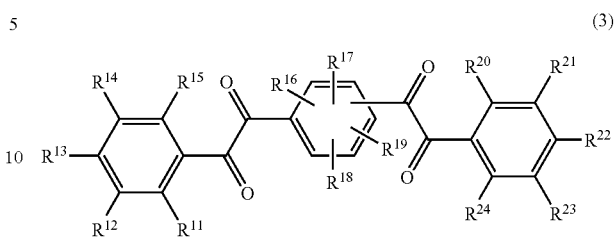

(wherein $R^{11}$ to $R^{24}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{11}$ to $R^{24}$ each may have a linear, branched or cyclic structure);

11) the method for producing the composite material for electrode as described in any one of 1) to 10) above, wherein the polymer having a quinoxaline structural unit contains a phenylquinoxaline structural unit represented by formula (4):

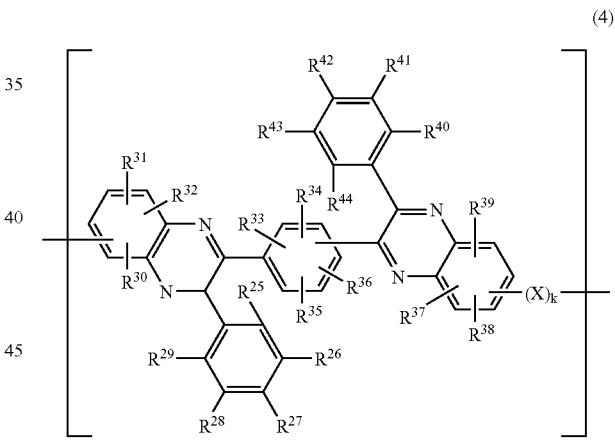

(wherein $R^{25}$ to $R^{44}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{25}$ to $R^{44}$ each may have a linear, branched or cyclic structure; X represents a heteroatom alone or an aryl group having from 2 to 20 carbon atoms which may have a heteroatom; and k represents an integer of 0 to 5);

12) the method for producing the composite material for electrode as described in any one of 1) to 11) above, comprising dehydration condensation polymerization of a tetramine derivative having two o-diaminophenyl groups and a tetracarbonyl compound having two (,-dicarbonyl groups in a solvent in the presence of an electrically conductive carbon material;

13) the method for producing the composite material for electrode as described in 12) above, wherein the solvent is at least one selected from the group of N,N-dimethylformamide, N-methylpyrrolidone, tetrahydrofuran, 1,2-dimethoxyethane, triethylene glycol dimethyl ether and tetraethylene glycol dimethyl ether and mixtures of two or more thereof;

14) the method for producing the composite material for electrode as described in 12) or 13) above, wherein the water content in the solvent is 2 weight % or less.

15) the method for producing the composite material for electrode as described in any one of 12) to 14) above, wherein the total weight ratio of a tetramine derivative having two o-diaminophenyl groups and a tetracarbonyl compound having two α,β-dicarbonyl groups is within a range of 5 to 40 weight %;

16) the method for producing the composite material for electrode as described in any one of 1) to 15) above, wherein the dehydration condensation polymerization is performed at a temperature range of 50 to 250° C.;

17) the method for producing the composite material for electrode as described in any one of 1) to 16) above, wherein the reaction time for dehydration condensation polymerization is within 15 to 100 hours;

18) the method for producing the composite material for electrode as described in any one of 1) to 17) above, wherein the stirring in dehydration condensation polymerization is performed at a rate of 150 to 500 rpm;

19) A composite material for electrode obtained by the method described in any one of 1) to 17) above, containing a polymer having a quinoxaline structural unit represented by formula (1):

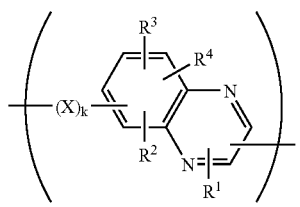

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) on the surface of an electrically conductive carbon material;

20) the composite material for electrode as described in 19) above, wherein the polymer is a polymer represented by formula (4):

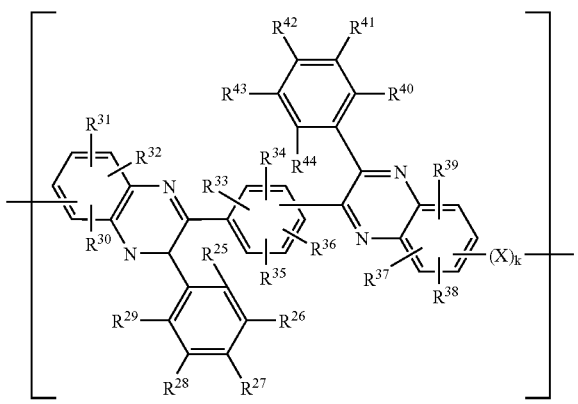

(wherein $R^{25}$ to $R^{44}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{25}$ to $R^{44}$ each may have a linear, branched or cyclic structure; X represents a heteroatom alone or an aryl group having from 2 to 20 carbon atoms which may have a heteroatom; and k represents an integer of 0 to 5);

21) the composite material for electrode obtained as described in 19) or 20) above, wherein composition ratio by weight of the polymer having a quinoxaline structural unit represented by formula (1):

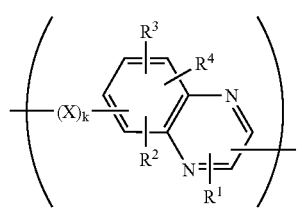

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) against the electrically conductive carbon material is within a range of from 50/50 to 95/5;

22) the composite material for electrode as described in any one of 19) to 21) above, wherein the volumetric conductivity at 25° C. is 0.1 S/cm or more;

23) the composite material for electrode as described in any one of 19) to 22) above, wherein the average particle size is from 1 to 20 μm and the maximum particle size is 200 μm or less;

24) the composite material for electrode as described in any one of 19) to 23) above, wherein the weight loss due to volatilization after heating at 150° C. for 1 hour under a pressure of 50,000 to 150,000 Pa is 5 weight % or less;

25) the composite material for electrode as described in any one of 19) to 24) above, wherein the halogen content is 1 weight % or less;

26) the composite material for electrode as described in any one of 19) to 25) above, wherein the content of alkali metal, alkali earth metal and/or rare earth metal is 0.5 weight % or less;

27) the composite material for electrode as described in any one of 19) to 26) above, wherein the ionic compound content is 1 weight % or less;

28) the composite material for electrode as described in any one of 19) to 27) above, wherein the weight average molecular weight of the absolute molecular weight of the polymer having a quinoxaline structural unit represented by formula (1):

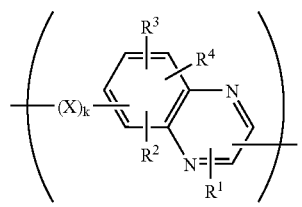

(1)

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) measured by a light scattering method is 5,000 or more;

29) the composite material for electrode as described in any one of 19) to 28) above, wherein the proportion of the polymer having a quinoxaline structural unit represented by formula (1):

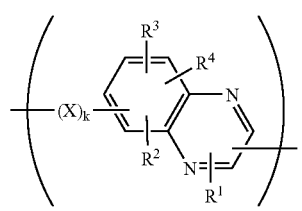

(1)

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) with a weight average molecular weight of the absolute molecular weight of less than 1,000 measured by a light scattering method is 5 weight % or less;

30) an electrode comprising the composite material for electrode as described in any one of 19) to 29) above;

31) a battery electrode comprising the composite material for electrode as described in any one of 19) to 30) above;

32) the electrode as described in 30) or 31) above, wherein the electrode density is 0.7 g/cm³ or more;

33) a method for producing the electrode as described in any one of 30) to 32) above, comprising molding at a temperature range of 150 to 500° C. under a pressure of 100 to 2,000 kg/cm²;

34) a battery comprising the electrode as described in any one of 30) to 32) above;

35) a secondary battery comprising the electrode as described in any one of 30) to 32) above for its negative electrode, wherein a positive electrode and/or the negative electrode performs a charge/discharge reaction by the insertion/release of a proton and the electrolyte has proton conductivity;

36) the secondary battery as described in 35) above, wherein the electrolyte is a proton-conductive solid and/or gel electrolyte;

37) the secondary battery as described in 35) or 36) above, wherein the electrolyte is a sulfuric acid solution having a concentration of 10 to 50 weight %; and 38) the secondary battery as described in any one of 35) to 37) above, the amount of the inorganic fine particle contained in the electrolyte is within a range of 0.1 to 50 weight %.

DETAILED DESCRIPTION OF THE INVENTION

The present invention is described in detail below. First, as present invention (I), a production method of a composite material for electrode comprising a polymer containing a quinoxaline structural unit as represented by formula (1) on the surface of an electrically conductive carbon material is specified.

The present invention (I) is a method for producing a composite material for electrode containing a polymer having a quinoxaline structural unit as represented by formula (1) on the surface of an electrically conductive carbon material,

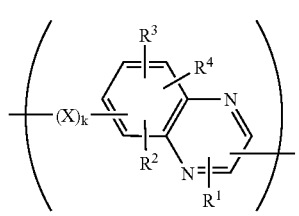

(1)

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5), characterized by involving dehydration condensation polymerization of a tetramine derivative having two o-diaminophenyl groups and a tetracarbonyl compound having two α,β-dicarbonyl groups in the presence of an electrically conductive carbon material.

<Electrically Conductive Carbon Material>

The electrically conductive carbon materials used in the method for producing a composite material for electrode of the present invention (I) is not particularly limited. Specific examples of the electrically conductive carbon material include carbon blacks such as Ketchen black and acetylene black, activated carbons such as coconut husk activated carbon, carbon fibers such as carbon whisker by vapor phase method, and graphites such as natural graphite and artificial graphite.

Generally, the material which has a high electric conductivity, a large specific surface area and a small particle size is preferably used. However, if the specific surface area is too large and/or the particle size is too small, the activity is elevated to readily cause a side reaction or the bulk is increased to reduce the volumetric energy density (Wh/L) in some cases. Accordingly, the electric conductivity is preferably 0.1 S/cm or more, more preferably 0.2 S/cm at a temperature range of 20 to 30° C.

The specific surface area by BET ($N_2$) method is preferably from 50 to 5,000 m$^2$/g, more preferably from 200 to 3,000 m$^2$/g and the average particle size is preferably from 0.5 to 30 μm, more preferably 1 to 25 μm.

Among these, a carbon black having high electric conductivity and a large specific surface area of 200 to 3,000 m$^2$/g is preferably contained in the electrically conductive carbon material at a concentration of 50 weight % or more, because the composite material obtained by compounding this carbon black with a polymer containing a quinoxaline structural unit can have high electric conductivity.

Furthermore, a fibrous carbon material having a large aspect ratio of 5 or more is preferably contained in the electrically conductive carbon material at a concentration of 10 to 40 weight %, because the composite material obtained can be improved in the electrode strength and, as an electrode, increased in the electric conductivity. In this case, the fibrous carbon material is preferably a fine fibrous carbon material having a fiber size (diameter) of 1 μm or less, preferably from 2 to 500 nm. Examples of such a carbon material include a vapor phase carbon fiber grown by thermally decomposing hydrocarbon according to a vapor phase method, and a carbon nanotube.

<Monomers>

In the method of the present invention (I) for producing a composite material for electrode comprising a polymer having a quinoxaline structural unit as represented by formula (1), a tetramine derivative having two o-diaminophenyl groups and a tetracarbonyl compound having two α,β-dicarbonyl groups can be used for monomers of the polymer having the quinoxaline structural unit.

The tetramine derivative having two o-diaminophenyl groups used as one of the monomers is not particularly limited. Preferably, the tetramine derivative is a compound as represented by formula (2):

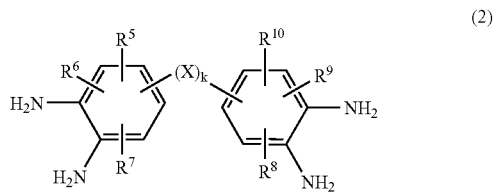

(wherein $R^5$ to $R^{10}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^5$ to $R^{10}$ each may have a linear, branched or cyclic structure; X represents a heteroatom alone or an aryl group having from 2 to 20 carbon atoms which may have a heteroatom; and k represents an integer of 0 to 5).

Specific examples of tetramine derivative include 3,3'-diaminobenzidine, 3,3',4,4'-tetraaminodiphenyl ether and a halogen, alkyl, alkoxy or nitro group substitution product thereof.

As the other monomer, the tetracarbonyl compound having two α,β-dicarbonyl groups used is not particularly limited. Preferably, the tetracarbonyl compound is a bisbenzyl derivative as represented by formula (3)

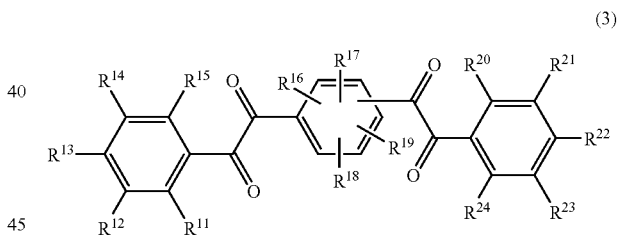

(wherein $R^{11}$ to $R^{24}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{11}$ to $R^{24}$ each may have a linear, branched or cyclic structure).

Specific examples of such tetracarbonyl derivative include 1,3-bisbenzyl, 1,4-bisbenzyl and a halogen, alkyl, alkoxy or nitro group substitution product thereof.

<Solvent>

In the method of the present invention (I) for producing a composite material for electrode comprising a polymer having a quinoxaline structural unit as represented by formula (1) on the surface of an electrically conductive carbon material, dehydration condensation polymerization of a tetramine derivative having two o-diaminophenyl groups and a tetracarbonyl compound having two α,β-dicarbonyl groups is performed in the presence of a solvent.

The solvent used is not particularly limited insofar as the monomer used is easily dissolved therein and the solvent does not get involved to react in dehydration condensation polymerization. A solvent having affinity for the electrically conductive carbon material as high as possible is preferred. Examples thereof include nitrogen-containing polar solvents such as N,N-dimethylformamide (hereinafter, simply referred to as "DMF") and N-methylpyrrolidone, and ethers such as tetrahydrofuran, 1,2-dimethoxyethane, triethylene glycol dimethyl ether and tetraethylene glycol dimethyl ether.

As for the monomer concentration in the solvent at the time when the polymerization reaction is initiated in the present invention (I), in a case where a solvent is employed, the total weight of bisbenzyl and/or a bisbenzyl derivative and a tetramine derivative is preferably from 5 to 40 weight %, more preferably from 8 to 30 weight %.

If the monomer concentration is too low, the polymerization hardly proceeds and the molecular weight is not increased, whereas if the monomer concentration is too high, the polymerization solution is elevated in the viscosity to cause difficulty in stirring the reaction solution or non-uniformity of the coating on the electrically conductive carbon material, and furthermore the polymer precipitates in the early stage, which results in failure to have a higher molecular weight.

Since the reaction is dehydration condensation polymerization, the smaller the water content is, the more preferable. Specifically, the water content of the solvent is preferably 2 weight % or less, more preferably 1 weight % or less, at the initiation. When a method of removing the generated water with a dehydrating agent or the like is employed, the polymerization can proceed more efficiently.

<Conditions for Dehydration Condensation Polymerization>

The reaction temperature is not particularly limited. The preferable reaction temperature varies depending on the kind of monomer or solvent used and cannot be indiscriminately specified, however, in general, the reaction is preferably performed in the vicinity of a reflux temperature of the solvent used. For example, in case of using DMF as solvent, the preferable reaction temperature is from 130 to 150° C. Generally, the preferable reaction temperature is within 50 to 250° C.

The reaction time is not particularly limited. The reaction time varies depending on the kind of monomer or solvent used and cannot be indiscriminately specified, however, since the reaction is a dehydration condensation polymerization reaction, a reaction time of at least 10 hours is necessary in order to form a polymer having sufficient properties for constituting the composite material for electrode. The reaction time preferably from 15 to 100 hours, more preferably from 20 to 70 hours.

The stirring rate at the dehydration condensation polymerization is preferably from 150 to 500 rpm (revolution per minute), more preferably from 200 to 400 rpm. If the stirring rate is too low, the dispersion of the electrically conductive carbon material or the pulverization of secondary particles does not proceed satisfactorily and the coverage by the polymer becomes non-uniform.

On the other hand, if the stirring rate is too high, the electrically conductive carbon material is pulverized to an excessively small size, the exposed portion on the surface of the electrically conductive carbon material is reduced by the covering of polymer, and the composite material disadvantageously has insufficient electric conductivity.

Next, the present invention (II) is specified. The present invention (II) is a composite material for electrode comprising a polymer having a quinoxaline structural unit represented by formula (1):

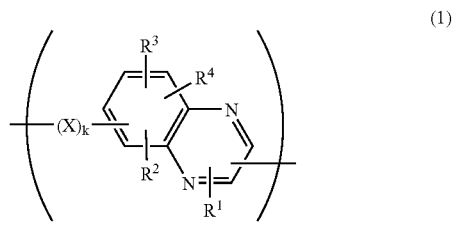

(wherein $R^1$ to $R^4$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) on the surface of an electrically conductive carbon material).

<Composition Ratio of Polymer to Electrically Conductive Carbon Material>

The composition ratio of the polymer to the electrically conductive carbon material of the present invention (II) is not particularly limited. The weight ratio of the polymer against the electrically conductive carbon material is within a range of from 50/50 to 5/95, more preferably within a range of from 30/70 to 92/8. If the amount of the electrically conductive carbon material added is too small, the amount of polymer coated becomes too large and the electric conductivity disadvantageously decreases. If the amount of the electrically conductive carbon material added is too large, the bulk increases, the molding becomes difficult, the amount of the polymer containing a quinoxaline structural unit, which is an active substance in the electrode, is reduced and the obtained composite material is disadvantageously decreased in the battery capacity per volume and per weight.

<Pulverization>

The composite material of an electrically conductive carbon material and a polymer containing as a repeating structure a quinoxaline structural unit represented by formula (1) of the present invention (II) is preferably pulverized to an appropriate particle size before use as an electrode. The particle size is preferably such that the average particle size is from 1 to 20 µm and the maximum particle size is 200 µm or less, more preferably the average particle size is 1 to 15 µm and the maximum particle size is 100 µm or less. The pulverization method is not particularly limited, however, examples thereof include a wet method such as beads mill, and a dry method such as pulverizer, bantam mill and ball mill.

<Electrical Conductivity>

The volumetric conductivity of the composite material of the present invention (II) at 25° C. is preferably 0.1 S/cm or more, more preferably 0.2 S/cm or more.

The conductivity value is calculated by four-terminal method, where resistivity is found by difference in potential and the reciprocal is derived therefrom.

<Volatile Components>

In molding an electrode of the present invention(III) from the composite material for electrode of the present invention (II), the presence of volatile components is not preferred because the electrode strength after the molding decreases. The volatile components are a solvent residue at the polymerization, a solvent residue at the washing, water adsorbed and the like, and it is preferable to remove these components by drying. The method for removing these components is not particularly limited, and any known method may be employed insofar as the method does not damage properties of the composite material of the present invention(II) which are essential as a material for electrode. For example, when heated at 150° C. for 1 hour under a pressure of 50,000 to 150,000 Pa, the dry state is preferably such that the weight loss is 5 weight % or less, more preferably 2 weight % or less.

<Impurities>

In applying the composite material for electrode of the present invention(II) to an electrode of the present invention (IV) and further to a battery of the present invention(V), it is not preferable that the composite material contains a large amount of impurities such as halogen, metals like alkali metal, alkali earth metal transition metal and rare earth metal, and ionic compounds, because the properties of the produced battery are liable to be damaged.

The content of halogen as an impurity component is preferably 1 weight % or less, more preferably 0.5 weight % or less.

The content of alkali metal, alkali earth metal, transition metal and/or rare earth metal as impurity components is preferably 0.5 weight % or less, more preferably 0.2 weight % or less.

The content of ionic compound as an impurity component is preferably 1 weight % or less, more preferably 0.5 weight % or less. Examples of ionic compound include nitrate ion, nitrite ion, sulfite ion and carbonate ion, however the ionic compound is not limited to these examples.

Examples of method for a quantitative analysis of these impurities include commonly used methods such as ion chromatography, atomic absorption spectrometry and inductively coupled plasma (ICP), however the method is not limited to these examples.

<Polymer Containing a Quinoxaline Structural Unit>

The molecular weight of the polymer containing a quinoxaline structural unit as represented by formula (1) in the composite material for electrode of the present invention (II) is not particularly limited. Preferably, the molecular weight is as high as possible, because the polymer can have good durability against repeated insertion/release of a proton and a side reaction due to the monomer functional group residue at the terminal less occurs. The molecular weight is preferably such that the weight average molecular weight in the measurement of an absolute molecular weight by a light scattering method is 5,000 or more, more preferably 10,000 or more. The proportion of the low molecular weight entity having a molecular weight of less than 1,000 is preferably 5 weight % or less, more preferably 3 weight % or less.

Preferable Examples of polymer having a quinoxaline structural unit represented by formula (1) include the followings.

As for the substituents in a polymer having a quinoxaline structural unit represented by formula (1), examples include a methyl group, a trifluoromethyl group and an ethyl group as substituent for the alkyl group which may have a heteroatom; an ethenyl group, a 2-propenyl group, a 1,3-butadienyl group and a 4-methoxy-2-butenyl group as substituent for the alkenyl group; an ethynyl group and a 2-propynyl group as substituent for the alkynyl group; and a phenyl group, a thienyl group, a pyrrolyl group, a 4-methoxyphenyl group, a 3-trifluoromethylphenyl group, a naphthyl group and a 3-methylthienyl group as substituent for the aryl group.

Preferably, X in formula (1) has a conjugate structure such as phenylene and naphthylene. Further, k, which represents the number of repetitions of X, may be 0, and is preferably 0, 1 or 2.

Polymer having a quinoxaline structural unit as represented by formula (4) is particularly preferable.

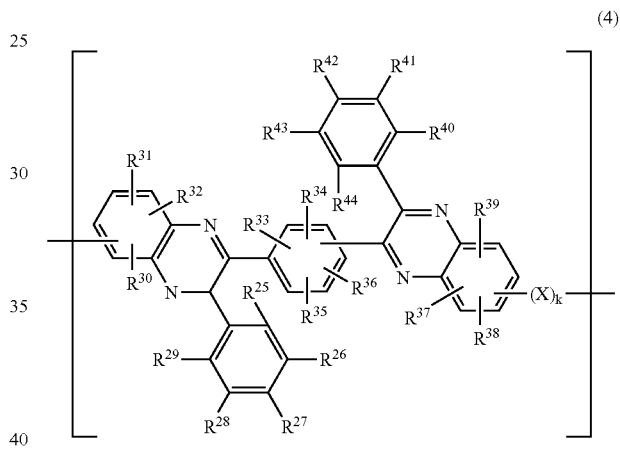

(4)

(wherein $R^{25}$ to $R^{44}$, which may be the same or different, each independently represents a hydrogen atom, a halogen, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{25}$ to $R^{44}$ each may have a linear, branched or cyclic structure; X represents a heteroatom alone or an aryl group having from 2 to 20 carbon atoms which may have a heteroatom; and k represents an integer of 0 to 5)

Examples of substituents in polymer having the quinoxaline structural unit are the same as recited in examples of substituents in polymer having a quinoxaline structural unit as represented by formula(1). Examples of X include oxygen, sulfur, selenium, NH, alkylated nitrogen, a phenylene group, a 2,5-dimethoxyphenylene group and a naphthylene group.

For elevating the activity of inserting/releasing a proton, it is presumed necessary to enlarge a conjugate structure of the quinoxaline structural unit as much as possible. Furthermore, since an acidic substance is used for the electrolyte as described later and there is a possibility that the battery is used also at high temperatures, the polymer must be a material having excellent resistance against acid and heat. From this standpoint, X in formula (4) is preferably a conjugate structure such as phenylene or naphthylene. k as the number of repetitions of X may be 0 but is preferably 0, 1 or 2.

Examples of such a polymer include polyquinoxaline (hereinafter, simply referred to as "PQ") and derivatives thereof and further include polyphenylquinoxaline (PPQ) and poly-2,2'-(p,p'-oxydiphenylene)-6,6'-oxydi(3-phenylquinoxaline) (hereinafter, simply referred to as "POPQ") described in *J. Polymer Science:* part A-1, Vol. 5, page 1453 (1967). Among these, polyquinoxaline, derivatives thereof and polyphenylquinoxaline are preferred because many quinoxaline structural units can be introduced and the conjugate structure can be easily enlarged.

Structures of polymer having as a repeating structural unit the quinoxaline structural unit represented by formula (1) of the present invention (II) can be analyzed and/or identified by nuclear magnetic resonance spectrum (hereinafter, simply referred to as "NMR"), infrared spectrum(hereinafter, simply referred to as "IR"), elemental analysis, mass spectrometry(hereinafter, simply referred to as "MS") and the like.

For example, polymer having a quinoxaline structural unit as represented by formula (1) is separated from the composite material of the present invention (II) by washing or other methods, and the quinoxaline structural unit can be detected from the structure of the decomposed product through thermogravimetric analysis-mass spectrometry (hereinafter, simply referred to as "TG-MS"), the content ratio of elements can be measured through elemental analysis, and the quinoxaline structural unit can be identified by detecting the bonding state through NMR or IR. This is described in detail in *J. Polymer Science:* part A-1, Vol. 5, page 1453 (1967).

The molecular weight of polymer having a quinoxaline structural unit as represented by formula (1) may be determined by liquid chromatography such as gel permeation chromatography (hereinafter, simply referred to as "GPC"). Specifically, it is general that the molecular weight of polymer having a quinoxaline structural unit as represented by formula (1) is measured through GPC, by separating the polymer from the composite material of the present invention (II) and dissolving the polymer in a solvent such as hexafluoroisopropanol. This is described, for example, in *J. Polymer Science:* part B: *Polymer physics,* Vol. 38, page 1348 (2000) and *Chemistry Letters,* page 1049 (1999).

Next, an electrode of the present invention (III) comprising the composite material of the present invention and a production method of the electrode as the present invention (IV) is specified.

<Molding of Electrode>

The method for molding an electrode of the present invention (III) from the composite material for electrode of the present invention (II) is not particularly limited, and any known production methods conventionally used may be employed.

The molding is performed, for example, as follows. The composite material of the present invention (II) is mixed with a solvent in which the polymer having a quinoxaline structural unit contained in the composite material dissolves or swells, and depending on the case, other electrode binder is added to prepare a paste. This paste is coated/dried on a collector and, if desired, pressed under pressure, thereby obtaining a composite electrode uniformly molded on the collector.

In another method, the composite material of the present invention in the powder form is dry filled in a die or depending on the case, after adding other electrode binder, the composite material is filled in a die, and then the composite material is heated and pressed under pressure, whereby a self-supporting electrode can be easily molded. Particularly, in this method, the polymer is softened by the heating and plays a role of a binder, therefore, other binder is not necessary or can be reduced to a very small amount. The electrode binder is electrically non-conductive and reduces not only the electric conductivity of the electrode as a whole but also the activity of the composite material as an electrode, therefore, this dry method of performing the heating and press molding without using other binder is recommended.

The heating temperature is preferably higher than softening temperature of the polymer having a quinoxaline structural unit contained in the composite material for electrode of the present invention (II). Though the preferable temperature range varies depending on the kind of the polymer used, generally, the molding is preferably performed at temperature of 150° C. or higher.

Too high a temperature is not preferable since the polymer having a quinoxaline structural unit contained in the composite material of the present invention (II) is liable to deteriorate by the heat. Generally, the temperature is 500° C. or lower. A high molding pressure is desired, preferably 100 kg/cm$^2$, more preferably 200 kg/cm$^2$.

<Collector>

The collector for use in the electrode of the present invention (III) is not particularly limited insofar as it is an electron-conductive sheet material, and examples thereof include various metal foils, various electrically conductive carbon material sheets such as graphite sheet, and electrically conductive rubber sheets. In particular, since a corrosive electrolyte material such as acidic aqueous solution is used in many cases, metal foils, electrically conductive carbon material sheets and electrically conductive rubber sheets having resistance against such an electrolyte material are preferred.

<Electrode Binder>

Examples of the other electrode binder which can be added at the molding of an electrode include fluororesins such as polyvinylidene fluoride (hereinafter, simply referred to as "PVDF") and Teflon(trademark), polyolefin resins such as polyethylene, and aromatic resins such as polyimide.

Next, a battery of the present invention (V) is specified. The present invention (V) is a battery comprising the electrode of the present invention (III).

<Structure and Production Method of Secondary Battery>

FIG. 1 shows a sheet-type battery as one construction example of the proton migration type secondary battery which is a typical embodiment of the present invention (V). The battery fundamentally has a stacked layer structure of positive electrode/proton-conductive electrolyte+separator/negative electrode. JP-A-11-126610 (EP 911893A1) and JP-A-11-144732(U.S. Pat. No. 6,248,474) disclose production methods of these secondary batteries.

<Negative Electrode>

For the negative electrode in a battery of the present invention (V), an electrode of the present invention (III) which comprises the composite material of the present invention (II) is used.

<Positive Electrode>

The positive electrode combined with the negative electrode in a battery of the present invention (V) is not particularly limited and may be sufficient if it is stable in an acidic solution, higher in the electric potential (on the order of 600 to 2,500 mV vs. NHE) than the negative electrode comprising the composite material of the present invention (II), and active to the reaction of inserting/releasing a proton.

Examples of such a material include graphite, various carbon materials such as activated carbon, electrically conductive polymers, metal oxides, metal chalcogenides and various organic metal complexes.

Among these, similarly to the quinoxaline-base polymer as the negative electrode material, electrically conductive polymers are preferred because the polymer is flexible and easily formed into a thin film electrode. Examples of the electrically conductive polymer as the positive electrode material include nitrogen-containing electrically conductive polymers such as polyaniline and derivatives thereof, polyindole and derivatives thereof, and polypyrrole and derivatives thereof; sulfur-containing electrically conductive polymers such as polythienylene and derivatives thereof, and polyisothianaphthenylene and derivatives thereof; polyquinone and derivatives thereof; polyfurylene and derivatives thereof; polyselenophene and derivatives thereof; and polyarylene vinylene and derivatives thereof, such as polyparaphenylene vinylene, polythienylene vinylene, polyfurylene vinylene and polynaphthenylene vinylene.

Among these, polyaniline and derivatives thereof, and polyindole and derivatives thereof are preferred because these ensure excellent efficiency in the charge/discharge by the doping/undoping reaction of a proton in an acidic solution.

When a sulfonic acid group is introduced into the side chain of these electrically conductive polymers, the activity to the reaction of inserting/releasing a proton is sometimes increased. Examples of the polymer having introduced therein a sulfonic acid group include sulfonated polyaniline obtained by treating polyaniline in a sulfuric acid, sulfonated thiophene and sulfonated polyisothianaphthene.

Also, polymers having a polyquinone structure, such as polyquinone, are preferred because of their large capacity for the insertion/release of a proton in a quinhydrone oxidation-reduction reaction.

Metal oxides and metal chalcogenides are preferred as the electrode material of the present invention in the point of high filling density and high volume capacity density. Examples thereof include manganese oxides, iron oxides, ruthenium oxides, titanium oxides, vanadium oxides and cobalt oxides.

<Proton-Conductive Electrolyte>

The proton-conductive electrolyte used in a battery of the present invention (V) is usually an acidic solution. Examples thereof include an aqueous sulfuric acid solution, an aqueous polystyrenesulfonic acid solution and an aqueous perchloric acid solution. An aqueous hydrochloric acid solution is highly volatile, therefore, its sole use is not preferred and, for example, compounding with other material is necessary.

In a battery of the present invention(V), the reliability and safety are more elevated by using a proton-conductive solid and/or gel electrolyte. The material used therefor is not particularly limited insofar as it is electron non-conductive, however, examples thereof include proton-conductive oxide solids such as alumina, silica, titania, magnesia and composite oxides of these with other metal(s), and proton-conductive polymers such as Nafion (Nafion™, trade name, produced by Du Pont), sulfonated imide and polystyrenesulfonic acid.

In a battery of the present invention(V), a so-called gel electrolyte obtained by compounding such an oxide solid or polymer with an electrolytic solution is used, whereby an electrolyte exhibiting sufficient performance in both the capability and the reliability can be obtained.

In a battery of the present invention(V), when an inorganic oxide fine particle is added to the acidic solution and/or the solid and/or gel electrolyte of the present invention, the solution- or electrolyte-holding property is more strengthened. The inorganic oxide fine particle may have a specific surface area, as a BET specific surface area, of 10 $m^2/g$ or more but preferably has a larger specific surface area. A fine particle having a BET specific surface area of 50 $m^2/g$ or more is preferred.

The inorganic fine particle (primary particle when a secondary particle is formed by the coagulation) used is not particularly limited on the size insofar as it can be mixed with the polymerizable composition, however, an inorganic fine particle having a maximum particle size of 10 μm or less, preferably from 0.001 to 1 μm is used. As for the shape, the fine particle may have various shapes such as spherical, egg, cubic, rectangular, cylindrical or bar form.

The inorganic fine particle for use in a battery of the present invention(V) is selected from those which are electron non-conductive and electrochemically stable. The inorganic fine particle is more preferably ion-conductive.

Examples of such an inorganic fine particle include ion-conductive or electrically non-conductive oxide fine particles such as alumina-base fine particle (e.g., α-, β- or γ-alumina), silica-base fine particle, titania-base fine particle, magnesia-base fine particle and composite oxide fine particle thereof. Among these, an alumina-base fine particle and a silica-base fine particle are preferred because of their excellent safety and large interaction with electrolyte ion. In particular, the surface of an alumina-base fine particle has high affinity for electrolyte anion and this provides an effect of reducing the binding of a proton and promoting the migration of the proton.

Specific examples of the alumina-base fine particle include an α-, β- or γ-type $Al_2O_3$ fine particle and an alumina composite oxide fine particle of the α-, β- or γ-type $Al_2O_3$ fine particle with other metal, which are obtained by various production methods such as solid phase method and vapor phase method. Among these, preferred is a γ-type $Al_2O_3$ fine particle having a large specific surface area and a large surface activity, such as Aluminum Oxide C (registered trademark, produced by DEGUSSA AG) and UA-5805 (produced by Showa Denko K.K.).

Specific examples of the silica-base fine particle include Aerosil (registered trademark, produced by DEGUSSA AG) and colloidal silica each having a large specific surface area and a large surface activity.

In blending the inorganic fine particle in the electrolytic solution or the solid or gel electrolyte, if the amount of the inorganic fine particle added is too large, there arises a problem such that the viscosity of the electrolytic solution or the solid or gel electrolyte increases or the ionic conductivity decreases. Accordingly, the amount of the inorganic fine particle added is preferably from 0.1 to 50 weight %, more preferably from 1 to 30 weight %, based on the weight of the electrolytic solution or solid or gel electrolyte after the addition.

<Separator>

In the case of using the acidic solution and/or solid and/or gel electrolyte of the present invention for a proton migration type battery, the solution or electrolyte is preferably used in combination with a separator similarly to other batteries, because the obtained battery can be free of short circuit or the like and can have excellent cycle property. The material used for the separator is not particularly limited and a material having resistance against heat, acid and oxidation-reduction and even when formed into a thin film, suffering from no problem in the strength may be selected from those used in normal aqueous or non-aqueous batteries.

Examples thereof include a polyolefin-base nonwoven fabric, a microporous film and/or this fabric or film subjected to a hydrophilization treatment and also include a microporous film of fluororesin, such as Teflon(registered trademark).

The thickness of the separator used is preferably as small as possible insofar as the separator has strength. The thickness is usually from 5 to 50 μm. The porosity is preferably as high as possible, however, if it is too high, there arises a problem such as short circuit, therefore, a separator having a porosity of 35 to 90% is usually used.

The thus-obtained positive electrode/proton-conductive electrolyte+separator/negative electrode stacked layer structure as a whole is housed in a battery case formed of aluminum laminate, polyolefin resin or the like, and molded with an insulating resin such as polyolefin resin or epoxy resin, whereby a proton migration type secondary battery of the present invention is obtained. The proton migration type secondary battery of the present invention is not limited to the sheet-type construction shown in FIG. 1 but may have any shape, such as chip type, coin type, rectangular type or cylindrical type. Also, the battery can be produced to have various sizes. The thickness of the battery varies depending on the shape but, in the case of a sheet-type battery, the thickness is 1 mm or less, for example, about 0.5 mm.

Figure 1:
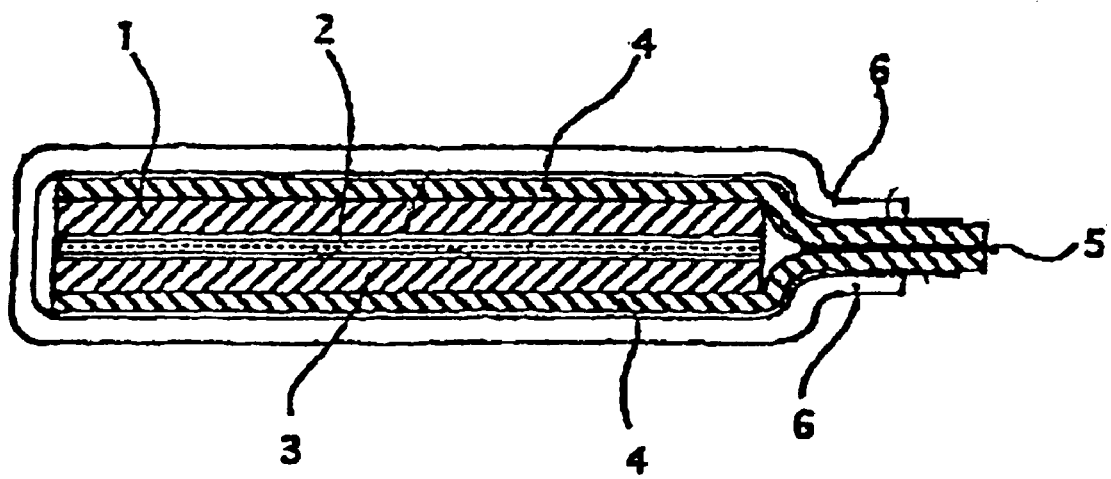
FIG. 1 is a schematic cross sectional view of a sheet-type battery as one example of the proton migration type battery of the present invention.

The numerical references represent the following portions, respectively.

1 positive electrode
2 proton-conductive electrolyte+separator
3 negative electrode
4 collector sheet
5 lead wire
6 case

BEST MODE FOR CARRYING OUT THE INVENTION

The present invention is described in greater detail by referring to representative Examples. These are mere illustrative Examples and the present invention is not limited thereto.

EXAMPLE 1

Synthesis of Composite Material (1) of Polyphenylquinoxaline/Ketchen Black (Hereinafter, Simply Referred to as "PPQ" and "KB", Respectively)

The reaction was performed according to the following scheme 1.

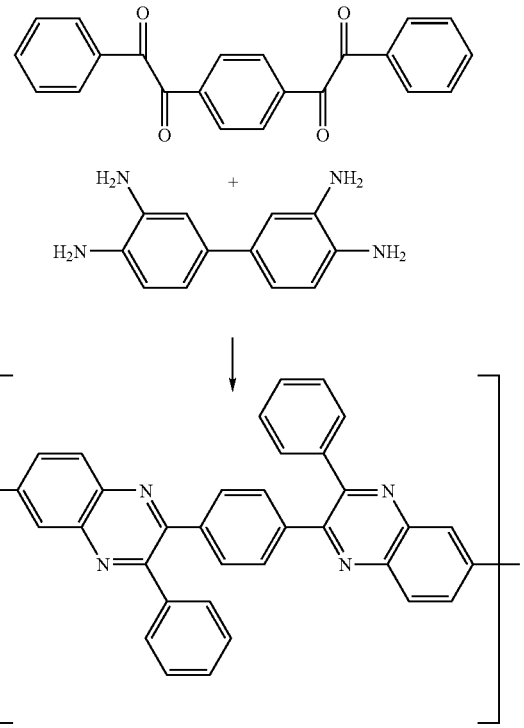

More specifically, 41.52 g of 1,4-bisbenzyl (hereinafter, simply referred to as "BBZ", molecular weight: 342.4, purity: 98%) and 25.98 g of 3,3-diaminobenzidine (hereinafter, simply referred to as "DABZ", molecular weight: 214.3, purity: 98%, produced by ALDRICH) were added to a 1,000 ml-volume glass-made four neck flask (with a stirring blade having a length of 4 cm and a condenser tube) containing 735 ml of dimethylformamide (hereinafter, simply referred to as "DMF", water content: 200 weight ppm), and stirred at a stirring rate of 300 rpm at room temperature for 30 minutes in a nitrogen atmosphere to completely dissolve BBZ and DABZ. Thereinto, 23.43 g of KB (specific surface area: 1200 $m^2/g$, produced by Lion, Grade: EC600JD) was charged with being stirred under the same condition and after elevating the temperature to 130 over 1 hour in a nitrogen atmosphere, the reaction was allowed to proceed while stirring at 130° C. for 35 hours.

The black precipitate obtained was filtered, washed with methanol, dried and then vacuum-dried at 120° C. for 12 hours to obtain 80.43 g of black powder of PPQ/KB composite material (1). This powder was observed by a scanning-type electron microscope (hereinafter, simply referred to as "SEM"), as a result, the particle size of the KB primary particle was larger than KB used. This suggests that PPQ is uniformly coated on the surface of KB. The elementary analysis value (weight %) of this powder was C: 88.15, H: 3.13, N: 8.18. This suggests that PPQ is compounded on KB at a compounding ratio (weight %) of 71/29 (PPQ/KB). From GPC using hexafluoroisopropanol (hereinafter, simply referred to as "HFIP") as an eluent, the absolute molecular weight (weight average) was determined by a light scattering method and found to be 32,000. The proportion of the polymer having an absolute molecular weight of less than 1,000 was 0.7 weight %. The electric conductivity (by four-terminal method) of this powder was 0.35 S/cm at 25° C.

EXAMPLES 2 TO 4 AND COMPARATIVE EXAMPLES 1 AND 2

Synthesis of PPQ/KB Composite Materials (2) to (6):

PPQ/KB composite materials (2) to (6) different in the physical properties were synthesized in the same manner as in Example 1 except for changing the synthesis conditions as shown in Table 1.

TABLE 1

Production of PPQ/KB Composite Materials

|  |  | BBZ, g | DABZ, g | KB, g | Polymerization Time, hr | PPQ/KB, by weight ratio | Electric Conductivity at 25° C., S/cm | PPQ Molecular Weight, weight average |
|---|---|---|---|---|---|---|---|---|
| Example 1 | Composite Material (1) | 41.52 | 25.98 | 23.43 | 35 | 71/29 | 0.35 | 32000 |
| Example 2 | Composite Material (2) | 50.25 | 31.45 | 11.03 | 35 | 86/14 | 0.12 | 36000 |
| Example 3 | Composite Material (3) | 36.42 | 22.79 | 30.30 | 35 | 62/38 | 0.50 | 28000 |
| Example 4 | Composite Material (4) | 41.52 | 25.98 | 23.43 | 15 | 70/30 | 0.34 | 15000 |
| Comparative Example 1 | Composite Material (5) | 53.54 | 33.5 | 6.60 | 35 | 92/8 | 0.05 | 37000 |
| Comparative Example 2 | Composite Material (6) | 29.11 | 18.22 | 40.03 | 35 | 50/50 | 0.70 | 25000 |

In these composite materials, the proportion of PPQ having an absolute molecular weight of less than 1,000 was (2) 0.5 weight %, (3) 0.8 weight %, (4) 3.0 weight %, (5) 0.5 weight % or (6) 2.8 weight %.

EXAMPLES 5 TO 8 AND COMPARATIVE EXAMPLES 3 AND 4

Pulverization of PPQ/KB Composite Materials (1) to (6):

In Examples 5 to 8 and Comparative Examples 3 and 4, the PPQ/KB composite materials (1) to (6) synthesized in Examples 1 to 4 and Comparative Examples 1 to 2 were dry pulverized by a pulverizer manufactured by Hosokawa Micron. The analysis values thereof are shown in Table 2.

TABLE 2

Pulverization of PPQ/KB Composite Materials (1) to (6)

|  |  | Average Particle Size, μm | Maximum Particle Size, μm | Impurities (weight ppm) | | | | | Volatile Material*[1], weight % |
|---|---|---|---|---|---|---|---|---|---|
|  |  |  |  | Cl | Na | K | Fe | Ni |  |
| Example 5 | Composite Material (1) | 10 | 100 | 60 | 40 | 15 | 10 | <10 | 0.8 |
| Example 6 | Composite Material (2) | 8 | 80 | 70 | 30 | 10 | 12 | <10 | 1.2 |
| Example 7 | Composite Material (3) | 12 | 110 | 40 | 40 | 35 | 10 | 12 | 1.5 |
| Example 8 | Composite Material (4) | 15 | 100 | 80 | 40 | 10 | 15 | 12 | 2.0 |
| Comparative Example 3 | Composite Material (5) | 15 | 120 | 50 | 50 | 18 | 10 | <10 | 0.8 |
| Comparative Example 4 | Composite Material (6) | 18 | 140 | 40 | 20 | 8 | 18 | 15 | 1.6 |

*[1]Weight loss due to volatilization after heating at 150° C. for 1 hour under a pressure of 101.3 kPa.

EXAMPLES 9 TO 12 AND COMPARATIVE EXAMPLES 5 AND 6

Molding of PPQ/KB Composite Materials (1) to (6):

In Examples 9 to 12 and Comparative Examples 5 and 6, PPQ/KB composite materials (1) to (6) pulverized in Examples 5 to 8 and Comparative Examples 3 and 4 were molded to a size of 1×1 cm and a thickness of 0.5 mm under pressure of 1,000 kg and heating at 250° C. for 15 minutes in air. From each composite material, 5 units were produced. The properties of each electrode obtained are shown in Table 3 (average of n=5).

TABLE 3

Properties of Each Electrode from PPQ/KB Composite Materials (1) to (6) (average of n = 5)

| | | Electrode Density, g/ml | Weight, mg | Properties |
|---|---|---|---|---|
| Example 9 | Composite Material (1) | 0.78 | 39 | No problem in strength. |
| Example 10 | Composite Material (2) | 0.84 | 42 | No problem in strength. |
| Example 11 | Composite Material (3) | 0.68 | 34 | Slightly weak strength. |
| Example 12 | Composite Material (4) | 0.80 | 40 | No problem in strength. |
| Comparative Example 5 | Composite Material (5) | 0.88 | 44 | No problem in strength. |
| Comparative Example 6 | Composite Material (6) | 0.60 | 30 | Fragile, readily broken. |

EXAMPLES 13 TO 15 AND COMPARATIVE EXAMPLES 7 AND 8

Synthesis of PPQ/KB+VGCF Composite Materials (7) to (11):

PPQ/KB+VGCF composite materials (7) to (11) were synthesized in the same manner as in Example 1 except for changing the composition of electrically conductive carbon materials as shown in Table 4 by mixing a vapor grown carbon fiber (hereinafter, simply referred to as "VGCF" (trademark, produced by Showa Denko K.K.), average fiber size: 0.15 μm. average fiber length: 10 μm, aspect ratio: 67).

TABLE 4

Production and Evaluation of PPQ/KB Composite Materials (7) to (11)

| | | PPQ/ KB + VGBF by weight ratio | KB/VGCF, by weight ratio | Electric Conductivity at 25° C., S/cm | PPQ Molecular Weight, weight average |
|---|---|---|---|---|---|
| Example 1 | Composite Material (1)* | 71/29 | 100/0 | 0.35 | 32000 |
| Example 13 | Composite Material (7) | 71/29 | 90/10 | 0.43 | 38000 |
| Example 14 | Composite Material (8) | 68/32 | 65/35 | 0.50 | 36000 |
| Example 4 | Composite Material (9) | 75/25 | 90/10 | 0.32 | 37000 |
| Comparative Example 1 | Composite Material (10) | 91/9 | 45/55 | 0.05 | 38000 |
| Comparative Example 2 | Composite Material (11) | 50/50 | 45/55 | 0.70 | 30000 |

*Comparison

In these composite materials, the proportion of PPQ having an absolute molecular weight of less than 1,000 was (7) 0.5 weight %, (8) 0.8 weight %, (9) 3.0 weight %, (10) 0.5 weight % or (11) 2.8 weight %.

EXAMPLES 16 TO 18 AND COMPARATIVE EXAMPLES 9 AND 10

Pulverization and Molding of PPQ/KB+VGCF Composite Materials (7) to (11):

In Examples 16 to 18 and Comparative Examples 9 and 10, the PPQ/KB+VGCF composite materials (7) to (11) synthesized in Examples 13 to 15 and Comparative Examples 7 to 8 were dry pulverized by a pulverizer manufactured by Hosokawa Micron and molded to a size of 1×1 cm and a thickness of 0.5 mm under pressure of 1,000 kg and heating at 250° C. for 15 minutes in air. From each composite material, 5 units were produced. The particle size after pulverization and the properties (average of n=5) of each electrode obtained are shown in Table 5.

TABLE 5

Properties after Pulverization and Molding of
PPQ/KB + VGCF Composite Materials (1) to (6)

|  |  | Average Particle Size, μm | Maximum Particle Size, μm | Electrode Density, g/ml | Weight, mg | Properties |
|---|---|---|---|---|---|---|
| Example 5 | Composite Material (1) | 10 | 100 | 0.78 | 39 | No problem in strength. |
| Example 16 | Composite Material (7) | 12 | 80 | 0.82 | 41 | No problem in strength. |
| Example 17 | Composite Material (8) | 12 | 100 | 0.78 | 39 | No problem in strength. |
| Example 18 | Composite Material (9) | 8 | 80 | 0.86 | 43 | No problem in strength. |
| Comparative Example 9 | Composite Material (10) | 15 | 100 | 0.68 | 42 | Slightly weak strength. |
| Comparative Example 10 | Composite Material (11) | 16 | 120 | 0.66 | 33 | Slightly weak strength. |

*Comparison

EXAMPLE 19

Synthesis of Polyaniline (Hereinafter, Simply Referred to as "PAn"):

According to the method described in JP-A-62-108459, aniline was oxidation-polymerized in a 1 N hydrochloric acid by using ammonium persulfate as an oxidizing agent, and then, neutralized with an aqueous ammonia solution to obtain 100 g of basic PAn as dark purple powder. By the elementary analysis and IR, this PAn was presumed to have nearly an objective structure. From the results of GPC in N-methyl pyrrolidone (hereinafter, simply referred to as "NMP"), the molecular weight (in terms of polymethylmetacrylate) of the PAn was found to be about 50,000 in the number average and about 120,000 in the weight average.

EXAMPLE 20

Production of PAn Positive Electrode:

To a 85:7:8 mixture of this PAn powder, acetylene black (hereinafter, simply referred to as "AB", produced by Denki Kagaku Kogyo Kabushiki Kaisha, BET specific surface area: 1,700m²/g) and polyvinylidene fluoride (hereinafter, simply referred to as "PVDF", produced by Kuraray Co., Ltd.), excess NMP was added to obtain a gel composition. This composition was coated on an electrically conductive film collector of 1×1 cm, molded under pressure of 1,000 kg and vacuum-dried at 80° C. for 8 hours to prepare 100 units of a PAn electrode (average: 38 mg) having a thickness of 0.5 mm.

EXAMPLES 21 TO 24 AND COMPARATIVE EXAMPLES 11 AND 12

Production of Proton Migration Type Secondary Battery:

On the PAn electrode prepared in Example 20, a polypropylene (hereinafter, simply referred to as "PP") microporous film separator (registered trademark: JURAGUARD 3501, produced by POLYPLASTIC, 25 μm, 1.2×1.2 cm) subjected to a hydrophilization treatment was stacked. On this separator, PPQ/KB composite electrode (1), (2), (3), (4), (5) or (6) produced in Examples 9 to 12 and Comparative Examples 5 and 6 was stacked and further thereon, the same electrically conductive film (1×1 cm) as used in Example 20 was stacked as a collector. These stacked electrodes, separator and collector were tightly bonded under pressure and then, the both edges were fixed with a polyimide tape.

Subsequently, to the electrically conductive film collectors in the positive electrode and negative electrode sides, a platinum foil was fixed as a lead wire using a silver paste. This laminate was placed in an aluminum laminate case and two platinum lead wires were taken outside so as not to cause short circuit. Thereafter, an aqueous 20% sulfuric acid solution was injected as an electrolytic solution into the inside of the case, the inside of the case was tightly fixed while extracting excess aqueous sulfuric acid solution under reduced pressure and then, the case was sealed by fusing under heating. In this way, 6 kinds of PPQ/KB composite material PAn-base secondary batteries (each n=3, total: 18 units) were manufactured as batteries of Examples 21 to 24 and Comparative Examples 11 and 12. FIG. 1 shows the battery construction inside the case.

Each battery was charged and discharged at 25° C., an operating voltage of 0 to 0.8 V and a current of 2 mA or 10 mA and results in the maximum discharge capacity are shown in Table 6. Also, each battery was discharged at 2 mA and 0° C. or −10° C. and the results are shown in Table 6. Furthermore, a cycle of charging and discharging was repeated at 10 mA and the results in the capacity after 200 cycles are shown in Table 6.

TABLE 6

Characteristics of Proton Migration Type Secondary Battery

|  | PPQ/KB Negative Electrode | Maximum Capacity (mAh) | | Low-Temperature Capacity (mAh) | | 10 mA/ 200 Cycles |
|---|---|---|---|---|---|---|
|  |  | 2 mA | 10 mA | 0° C. | −10° C. | (mAh) |
| Example 21 | Composite Material (1) | 2.2 | 2.1 | 2.0 | 1.5 | 2.1 |
| Example 22 | Composite Material (2) | 2.6 | 2.0 | 2.4 | 2.0 | 1.9 |
| Example 23 | Composite Material (3) | 1.8 | 1.8 | 1.7 | 1.4 | 1.7 |
| Example 24 | Composite Material (4) | 2.2 | 2.1 | 2.0 | 1.4 | 1.7 |
| Comparative Example 11 | Composite Material (5) | 1.5 | 0.7 | 1.0 | 0.3 | 0.2 |
| Comparative Example 12 | Composite Material (6) | 1.2 | 1.2 | 1.1 | 0.8 | 0.6 |

COMPARATIVE EXAMPLE 13

Production, Analysis and Evaluation of PPQ/KB Composite Material (4)':

The PPQ/KB composite material (4) produced in Example 4 was dried without washing it with methanol, and thereafter pulverized in the same manner as in Example 8 to obtain PPQ/KB composite material pulverized powder (4)'. In this powder, the PPQ/KB weight ratio was 71/29, the weight average molecular weight was 14,500, the proportion of polymer having a molecular weight of less than 1,000 was as large as 7.0%, and the electric conductivity and the impurity amount were the same as those of the PPQ/KB composite material (4). After the pulverization, the average particle size was 16 μm and the maximum particle size was 100 m, however, after heating at 150° C. for 1 hour under a pressure of 101.3 kPa, the weight loss due to volatilization was as large as 6.3 weight %.

Using this powder, molding of an electrode was attempted in the same manner as in Example 12, however, cracking, warping or the like occurred after the molding and the evaluation of battery could not be performed.

COMPARATIVE EXAMPLE 14

Production, Analysis and Evaluation of PPQ/KB Composite Material (1)':

The PPQ/KB composite material (1) produced in Example 1 was pulverized in the same manner as in Example 5 by lowering the performance of the pulverizer to obtain PPQ/KB composite material pulverized powder (1)'. In this powder, the PPQ/KB weight ratio, the weight average molecular weight, the proportion of polymer having a molecular weight of less than 1,000, the electric conductivity, the amount of impurities and the weight loss due to volatilization after the heating at 150° C. for 1 hour under a pressure of 101.3 kPa were the same as those of the PPQ/KB composite material (1). After the pulverization, the average particle size and the maximum particle size were as large as 25 μm and 300 μm, respectively.

Using this powder, an electrode was molded in the same manner as in Example 9, as a result, an electrode having an average electrode bulk density of 0.70 g/ml and an average electrode weight of 35 mg and having no problem in the strength was obtained. Using this electrode, a PPQ/KB composite material PAn-base secondary battery (n=3) shown in FIG. 1 was manufactured in the same manner as in Example 15.

This battery was charged and discharged at 25° C., an operating voltage of 0 to 0.8 V, a current of 2 mA or 10 mA and the results in the maximum discharge capacity, the discharge capacity at 2 mA and 0° C. or -10° C. and the capacity after 200 cycles of charging and discharging at 10 mA are shown in Table 7.

TABLE 7

Characteristics of Proton Migration Type Secondary Battery

| PPQ/KB Negative Electrode | Maximum Capacity (mAh) | | Low-Temperature Capacity (mAh) | | 10 mA/ 200 Cycles |
|---|---|---|---|---|---|
| | 2 mA | 10 mA | 0° C. | -10° C. | (mAh) |
| Comparative Example 14 Composite Material (1) | 1.8 | 1.5 | 1.5 | 1.7 | 1.0 |

EXAMPLES 25 TO 27 AND COMPARATIVE EXAMPLES 15 AND 16

Production of Proton Migration Type Secondary Battery:

On the PAn electrode prepared in Example 20, a PP microporous film separator (JURAGUARD 3501, produced by POLYPLASTIC, 25 μm, 1.2×1.2 cm) subjected to a hydrophilization treatment was stacked. On this separator, PPQ/KB+VGCF composite electrode (7), (8), (9), (10), or (11) produced in Examples 16 to 18 and Comparative Examples 9 and 10 was stacked and further thereon, the same electrically conductive film (1×1 cm) as used in Example 20 was stacked as a collector. These stacked electrodes, separator and collector were tightly bonded under pressure and then, the both edges were fixed with a polyimide tape.

Subsequently, to the electrically conductive film collectors in the positive electrode and negative electrode sides, a platinum foil was fixed as a lead wire using a silver paste. This laminate was placed in an aluminum laminate case and two platinum lead wires were taken outside so as not to cause short circuit. Thereafter, an aqueous 20% sulfuric acid solution was. injected as an electrolytic solution into the inside of the case, the inside of the case was tightly fixed while extracting excess aqueous sulfuric acid solution under reduced-pressure and then, the case was sealed by fusing under heating. In this way, 6 kinds of PPQ/KB+VGCF composite material PAn-base secondary batteries (each n=3, total: 18 units) were manufactured as batteries of Examples 25 to 27 and Comparative Examples 15 and 16. FIG. 1 shows the battery construction inside the case.

Each battery was charged and discharged at 25° C., an operating voltage of 0 to 0.8 V and a current of 2 mA or 10 mA and results in the maximum discharge capacity are shown in Table 8. Also, each battery was discharged at 2 mA and 0° C. or -10° C. and the results are shown in Table 8. Furthermore, a cycle of charging and discharging was repeated at 10 mA and the results in the capacity after 200 cycles are shown in Table 8.

TABLE 8

Characteristics of Proton Migration Type Secondary Battery

| | PPQ/KB + VGCF Negative Electrode | Maximum Capacity (mAh) | | Low-Temperature Capacity (mAh) | | 10 mA/ 200 Cycles |
|---|---|---|---|---|---|---|
| | | 2 mA | 10 mA | 0° C. | -10° C. | (mAh) |
| Example 21 | Composite Material (1)* | 2.2 | 2.1 | 2.0 | 1.5 | 2.1 |
| Example 25 | Composite Material (7) | 2.3 | 2.3 | 2.1 | 1.8 | 2.3 |
| Example 26 | Composite Material (8) | 1.8 | 1.8 | 1.7 | 1.4 | 1.7 |
| Example 27 | Composite Material (9) | 2.2 | 2.1 | 2.0 | 1.4 | 1.7 |
| Comparative Example 15 | Composite Material (10) | 1.5 | 0.7 | 1.0 | 0.3 | 0.2 |
| Comparative Example 16 | Composite Material (11) | 1.2 | 1.2 | 1.1 | 0.8 | 0.6 |

*Comparison

EXAMPLE 28

Production, Analysis and Evaluation of PPQ/AB Composite Material (12):

A PPQ/AB composite material (12) was produced in the same manner as in Example 1 except for using the same amount of AB(BET specific surface area: 1,700 m$^2$/g) as the electrically conductive carbon material in place of KB used in Example 1. The elementary analysis value (weight %) of this powder was C: 88.10, H: 3.12, N: 8.18. This suggests that PPQ is compounded on AB at a compounding ratio (weight %) of 71/29 (PPQ/AB). From GPC using HFIP as an eluent, the absolute molecular weight (weight average) was determined by a light scattering method and found to be 36,000. The electric conductivity (by four-terminal method) of this powder was 0.25 S/cm at 25° C.

Subsequently, pulverization and molding (5 units) were performed in the same manner as in Example 5 to obtain a PPQ/AB composite negative electrode (12). After the pulverization, the average particle size was 8 μm and the maximum particle size was 100 μm. Furthermore, after the pulverization, the average negative electrode bulk density was 0.82 g/cm³ and the average negative electrode weight was 41 mg, thus, there was no problem in view of strength.

Using this electrode, a PPQ/AB composite material PAn-base secondary battery (n=3) shown in FIG. 1 was manufactured in the same manner as in Example 21.

This battery was charged and discharged at 25° C., an operating voltage of 0 to 0.8 V, a current of 2 mA or 10 mA and the results in the maximum discharge capacity, the discharge capacity at 2 mA and 0° C. or −10° C. and the capacity after 200 cycles of charging and discharging at 10 mA are shown in Table 9.

TABLE 9

Characteristics of Proton Migration Type Secondary Battery

| PPQ/AB Negative | Maximum Capacity (mAh) | | Low-Temperature Capacity (mAh) | | 10 mA/ 200 Cycles |
|---|---|---|---|---|---|
| Electrode | 2 mA | 10 mA | 0° C. | −10° C. | (mAh) |
| Example 28 Composite Material (12) | 1.8 | 1.6 | 1.7 | 1.2 | 1.6 |

EXAMPLE 29

Synthesis of Polyphenylquinoxaline Ether (Hereinafter, Simply Referred to as "PPQE")/KB Composite Material (1):

The reaction was performed according to the following scheme 2.

Scheme 2

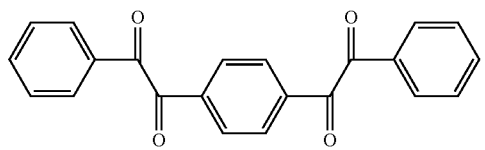

+

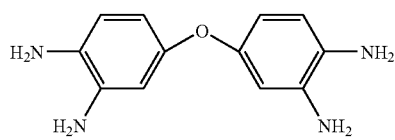

↓

-continued

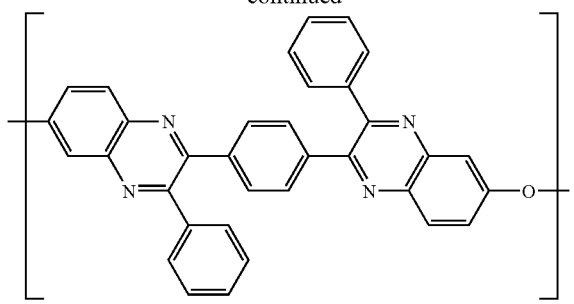

More specifically, 9.27 g of PPQE/KB black powder was obtained in the same manner as in Example 1 except for using 5.05 g of 3,3',4,4'-tetraaminodiphenyl ether (simply referred to as "TADE", molecular weight: 230.27, purity: 98%) in place of DABZ used in Example 1. This powder was observed by SEM, as a result, the particle size of the KB primary particle was large as compared with KB used and this suggests that PPQE is uniformly coated on KB. The elementary analysis value (weight %) of this powder was C: 85.64, H: 3.09, N: 7.95, O: 3.22 and this suggests that PPQE is compounded on KB at a compounding ratio (by weight) of 71/29 (PPQE/KB). From the gel permeation chromatography using HFIP as an eluent, the absolute molecular weight (weight average) was determined by a light scattering method and found to be 38,000. The proportion of the polymer having an absolute molecular weight of less than 1,000 was 0.5 weight %. The electric conductivity (by four-terminal method) of this powder was 0.40 S/cm at 25° C.

EXAMPLE 30

Synthesis of Polymethoxyphenylquinoxaline (Hereinafter, Simply Referred to as "PMPQ")/KB Composite Material (1):

The reaction was performed according to the following scheme 3.

Scheme 3

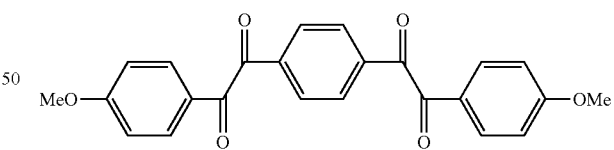

+

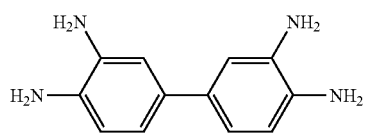

↓

-continued

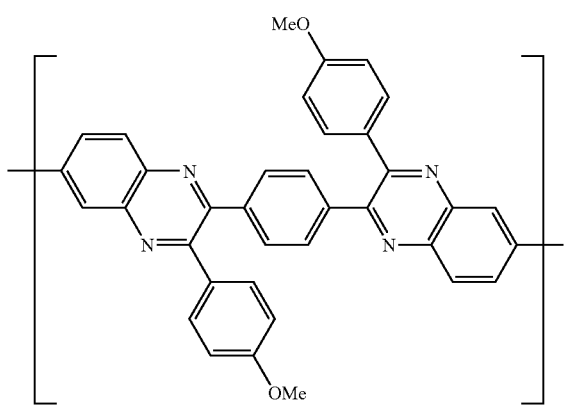

More specifically, 17.11 g of PMPQ/KB black powder was obtained in the same manner as in Example 1 except for using 9.30 g of BBZ methoxy form (hereinafter, simply referred to as BBZOM, molecular weight: 404.41, purity: 98%) in place of BBZ used in Example 1. This powder was observed by SEM, as a result, the particle size of the KB primary particle was large as compared with KB used and this suggests that PMPQ is uniformly coated on KB. The elementary analysis value (weight %) of this powder was C: 57.00, H: 3.40, N: 7.38, O: 4.22 and this suggests that PMPQ is compounded on KB at a compounding ratio (by weight) of 72/28 (PMPQ/KB). From GPC using HFIP as an eluent, the absolute molecular weight (weight average) was determined by a light scattering method and found to be 23,000. The proportion of the polymer having an absolute molecular weight of less than 1,000 was 0.8 weight %. The electric conductivity (by four-terminal method) of this powder was 0.25 S/cm at 25° C.

EXAMPLES 31 AND 32

The PPQE/KB composite material (1) and PMPQ/KB composite material (1) synthesized in Examples 29 and 30 were dry pulverized by a pulverizer manufactured by Hosokawa Micron in the same manner as in Example 5. The analysis values thereof are shown in Table 10.

TABLE 10

Pulverization of PPQE/KB Composite Material(1) and PMPQ/KB Composite Material (1)

| | | Average Particle Size, μm | Maximum Particle Size, μm | Impurities (weight ppm) | | | | | Volatile Material*[1], weight % |
|---|---|---|---|---|---|---|---|---|---|
| | | | | Cl | Na | K | Fe | Ni | |
| Example 31 | PPQE/KB (1) | 10 | 110 | 50 | 30 | 10 | 10 | <10 | 1.5 |
| Example 32 | PMQE/KB (1) | 11 | 100 | 50 | 40 | 12 | 12 | <10 | 1.2 |

*[1]Weight loss due to volatilization after heating at 150° C., 101.3 kPa for 1 hour under atmospheric pressure.

EXAMPLES 33 AND 34

Molding of PPQE/KB Composite Material (1) and PMPQ/KB Composite Material (1):

The PPQE/KB composite material (1) and PMPQ/KB composite material (1) pulverized in Examples 31 and 32 were molded into a size of 1×1 cm and a thickness of 0.5 mm under pressure of 1,000 kg/cm$^2$ and heating at 250° C. for 15 minutes in air in the same manner as in Example 9. From each composite material, 5 units were produced. The properties of each electrode obtained are shown in Table 11 (average of n=5).

TABLE 11

Properties of Each Electrode from PPQE/KB Composite Material (1) and PMPQ/KB Composite Material (1) (average of n = 5)

| | | Electrode Density, g/ml | Weight, mg | Properties |
|---|---|---|---|---|
| Example 33 | PPQE/KB (1) | 0.82 | 41 | No problem in strength. |
| Example 34 | PMQE/KB (1) | 0.84 | 42 | No problem in strength. |

EXAMPLES 35 AND 36

Evaluation of Battery using PPQE/KB Composite Material (1) or PMPQ/KB Composite Material (1):

Using the PPQE/KB (1) electrode and PMPQ/KB (1) electrode molded in Examples 33 and 34, a PPQE/KB composite material or PPQ/KB composite material PAn-base secondary battery (n=3) shown in FIG. 1 was manufactured in the same manner as in Example 15.

Each battery was charged and discharged at 25° C., an operating voltage of 0 to 0.8 V and a current of 2 mA or 10 mA. The results in the maximum discharge capacity, the charge capacity at 2 mA and 0° C. or −10° C. and the capacity after 200 cycles of charging and discharging at 10 mA are shown in Table 12.

TABLE 12

Characteristics of Proton Migration Type Secondary Battery

| | Negative Electrode | Maximum Capacity (mAh) | | Low-Temperature Capacity (mAh) | | 10 mA/ 200 Cycles |
|---|---|---|---|---|---|---|
| | | 2 mA | 10 mA | 0° C. | −10° C. | (mAh) |
| Example 35 | PPQE/KB (1) | 1.9 | 1.9 | 1.8 | 1.4 | 1.8 |
| Example 36 | PMQE/KB (1) | 2.0 | 1.9 | 1.8 | 1.4 | 1.9 |

EXAMPLE 37

Preparation of Polymer Solid Electrolyte Film:

An alcohol solution of Nafion (registered trademark, produced by Du Pont) was coated on a glass substrate and air-dried to form Nafion Film A having a thickness of about 50 μm.

This film was dipped in a 40% sulfuric acid solution (25° C., 0.8 S/cm), as a result, absorbed about 4 times in weight of the solution. The ionic conductivity in this case was measured at 25° C. and −10° C. by an impedance method and found to be 0.32 S/cm and 0.05 S/cm, respectively.

EXAMPLE 38

Preparation of Alumina-Containing Polymer Solid Electrolyte Film:

To the same Nafion/alcohol solution as used in Example 37, a high-purity y-alumina (UA5805, trade name, produced by Showa Denko K.K., crystal particle size: 0.03 μm, average secondary particle size: 1.8 μm, BET specific surface area: 80 m²/g) heat-treated at 1,000° C. for 2 hours was added to have a concentration of 5 weight % based on the weight of Nafion, and uniformly dispersed by a paint shaker. The obtained solution was coated and air-dried in the same manner as in Example 37 to produce Nafion/Alumina Composite Film B having a thickness of about 50 μm.

This film was dipped in a 40% sulfuric acid solution (25° C., 0.8 S/cm), as a result, absorbed about 6 times in weight of the solution. The ionic conductivity in this case was measured at 25° C. and −10° C. by an impedance method and found to be 0.37 S/cm and 0.08 S/cm, respectively.

EXAMPLES 39 AND 40

Production and Evaluation of Polymer Solid Electrolyte-Base Proton Migration Type Secondary Battery PPQ/KB composite material (1) PAn-base secondary batteries (each n=3) shown in FIG. 1 were manufactured in the same manner as in Example 15 except that Nafion Film A or Nafion/Alumina Composite Film B (1.2×1.2 cm) obtained in Example 37 or 38 was used as a separator in place of JURAGUARD 3501.

Each battery was charged and discharged at 25° C., an operating voltage of 0 to 0.8 V and a current of 2 mA or 10 mA. The results in the maximum discharge capacity, the charge capacity at 2 mA and 0° C. or −10° C. and the capacity after 200 cycles of charging and discharging at 10 mA are shown in Table 13.

TABLE 13

Characteristics of Proton Migration Type Secondary Battery

| | Electrolyte | Maximum Capacity (mAh) | | Low-Temperature Capacity (mAh) | | 10 mA/ 200 Cycles |
|---|---|---|---|---|---|---|
| | | 2 mA | 10 mA | 0° C. | −10° C. | (mAh) |
| Example 39 | Nafion Film A | 2.2 | 1.9 | 1.7 | 1.2 | 1.9 |
| Example 40 | Composite Film B | 2.2 | 2.0 | 1.8 | 1.4 | 2.0 |

INDUSTRIAL APPLICABILITY

According to the present invention, i.e., the method comprising dehydration condensation polymerization of a tetramine derivative having two o-diaminophenyl groups and a tetracarbonyl compound having two α,β-dicarbonyl groups in the presence of an electrically conductive carbon material, and the composite material for electrode comprising a polymer having a quinoxaline structural unit on the electrically conductive carbon material surface obtained by the method, it is revealed that an electrode material having a larger capacity of inserting/releasing a proton and better durability as compared with conventional composite materials obtained by mixing a polymer having a quinoxaline structural unit with an electrically conductive carbon material.

Moreover, it is clear that an electrode using the composite material for electrode obtained by the method of the present invention and a battery using the electrode are excellent in safety, reliability and high-speed current characteristics, and that the battery according to the present invention has a longer life and a larger gravimetric energy density (Wh/kg) as compared with conventional lead storage batteries or an aqueous solution-type double-layer capacitor using a sulfuric acid.

The invention claimed is:

1. A method for producing a composite material for electrode containing a polymer having a quinoxaline structural unit represented by formula (1):

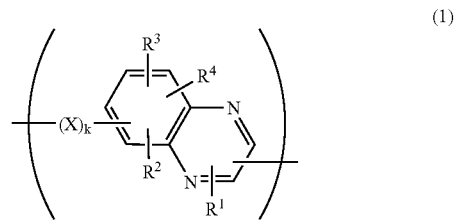

(1)

(wherein $R^1$ to $R^4$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) on the surface of an electrically conductive carbon material, comprising dehydration condensation polymerization of a tetramine derivative having two o-diaminophenyl groups and a tetracarbonyl compound having two α, β-dicarbonyl groups in the presence of an electrically conductive carbon material.

2. The method for producing the composite material for electrode as claimed in claim 1, wherein the electrically conductive carbon material is at least one selected from the group consisting of carbon black, activated carbon, carbon fiber and graphite.

3. The method for producing the composite material for electrode as claimed in claim 1, wherein the conductivity of the electrically conductive carbon material at 20 to 30° C. is 0.1 S/cm or more.

4. The method for producing the composite material for electrode as claimed in claim 1, wherein the BET specific surface area of the electrically conductive carbon material is within a range of 50 to 5,000 m²/g.

5. The method for producing the composite material for electrode as claimed in claim 1, wherein the average particle size of the electrically conductive carbon material is within a range of 0.5 to 30 μm.

6. The method for producing the composite material for electrode as claimed in claim 1, wherein the electrically conductive carbon material contains a fibrous carbon material having an aspect ratio of 5 or more at a concentration of 1 to 40 weight %.

7. The method for producing the composite material for electrode as claimed in claim 6, wherein the electrically conductive carbon material which is a vapor phase grown carbon fiber or a carbon nanotube and has a fiber size (diameter) of 1 μm or less.

8. The method for producing the composite material for electrode as claimed in claim 1, wherein the tetramine derivative having two o-diaminophenyl groups is a tetramine derivative represented by formula (2)

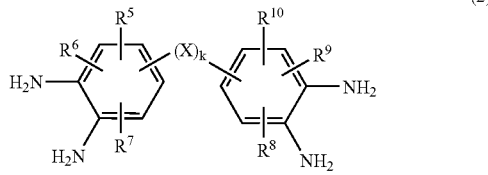

(wherein $R^5$ to $R^{10}$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^5$ to $R^{10}$ each may have a linear, branched or cyclic structure; X represents a heteroatom alone or an aryl group having from 2 to 20 carbon atoms which may have a heteroatom; and k represents an integer of 0 to 5).

9. The method for producing the composite material for electrode as claimed in claim 1, wherein the tetramine derivative represented by formula (2) is at least one selected from the group consisting of 3,3'-diaminobenzidine, 3,3',4,4'-tetraaminodiphenyl ether, and a halogen, alkyl, alkoxy or nitro group substitution product thereof.

10. The method for producing the composite material for electrode as claimed in claim 1, wherein the tetracarbonyl compound having two α, β-dicarbonyl groups is a bisbenzyl derivative represented by formula (3):

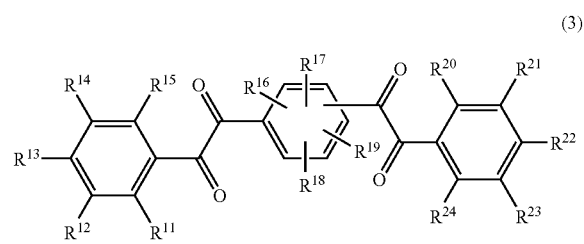

(wherein $R^{11}$ to $R^{24}$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{11}$ to $R^{24}$ each may have a linear, branched or cyclic structure).

11. The method for producing the composite material for electrode as claimed in claim 1, wherein the polymer having a quinoxaline structural unit contains a phenylquinoxaline structural unit represented by formula (4):

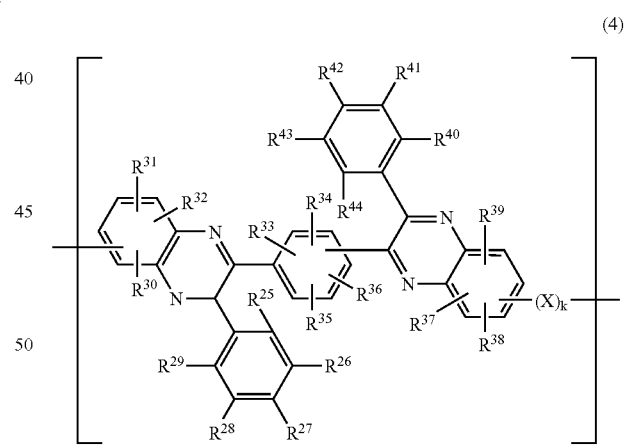

(wherein $R^{25}$ to $R^{44}$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{25}$ to $R^{44}$ each may have a linear, branched or cyclic structure; X represents a heteroatom alone or an aryl group having from 2 to 20 carbon atoms which may have a heteroatom; and k represents an integer of 0 to 5).

12. The method for producing the composite material for electrode as claimed in claim 1, comprising dehydration condensation polymerization of a tetramine derivative having two o-diaminophenyl groups and a tetracarbonyl compound having two α, β-dicarbonyl groups in a solvent in the presence of an electrically conductive carbon material.

13. The method for producing the composite material for electrode as claimed in claim 12, wherein the solvent is at least one selected from the group consisting of N,N-dimethylformamide, N-methylpyrrolidone, tetrahydrofuran, 1,2-dimethoxyethane, triethylene glycol dimethyl ether and tetraethylene glycol dimethyl ether and mixtures of two or more thereof.

14. The method for producing the composite material for electrode as claimed in claim 12, wherein the water content in the solvent is 2 weight % or less.

15. The method for producing the composite material for electrode as claimed in claim 12, wherein the total weight ratio of a tetramine derivative having two o-diaminophenyl groups and a tetracarbonyl compound having two α, β-dicarbonyl groups is within a range of 5 to 40 weight %.

16. The method for producing the composite material for electrode as claimed in claim 1, wherein the dehydration condensation polymerization is performed at a temperature range of 50 to 250° C.

17. The method for producing the composite material for electrode as claimed in claim 1, wherein the reaction time for dehydration condensation polymerization is within 15 to 100 hours.

18. The method for producing the composite material for electrode as claimed in claim 1, wherein the stirring in dehydration condensation polymerization is performed at a rate of 150 to 500 rpm.

19. A composite material for electrode obtained by the method as claimed in claim 1, containing a polymer having a quinoxaline structural unit represented by formula (1):

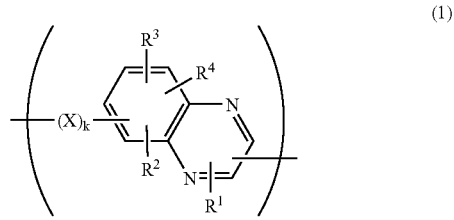

(1)

(wherein $R^1$ to $R^4$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) on the surface of an electrically conductive carbon material.

20. The composite material for electrode as claimed in claim 19, wherein the polymer is a polymer represented by formula (4):

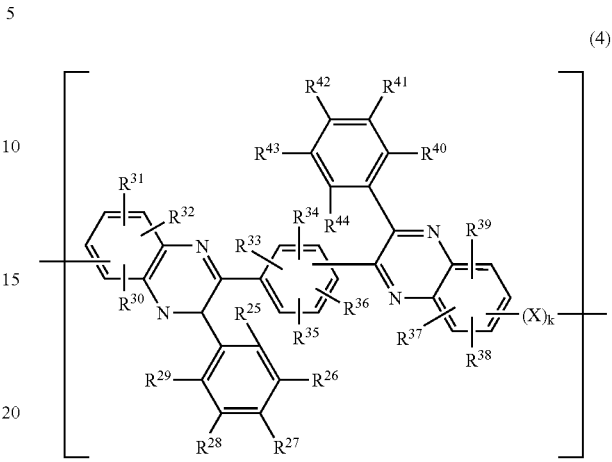

(4)

(wherein $R^{25}$ to $R^{44}$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^{25}$ to $R^{44}$ each may have a linear, branched or cyclic structure; X represents a heteroatom alone or an aryl group having from 2 to 20 carbon atoms which may have a heteroatom; and k represents an integer of 0 to 5).

21. The composite material for electrode obtained as claimed in claim 19, wherein composition ratio by weight of the polymer having a quinoxaline structural unit represented by formula (1):

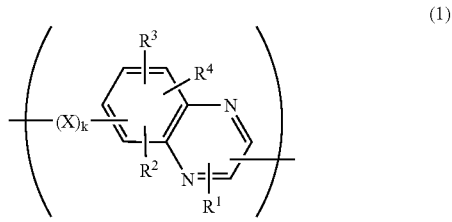

(1)

(wherein $R^1$ to $R^4$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) against the electrically conductive carbon material is within a range of from 50/50 to 95/5.

22. The composite material for electrode as claimed in claim 19, wherein the volumetric conductivity at 25° C. is 0.1 S/cm or more.

23. The composite material for electrode as claimed in claim 19, wherein the average particle size is from 1 to 20 μm and the maximum particle size is 200 μm or less.

24. The composite material for electrode as claimed in claim 19, wherein the weight loss due to volatilization after heating at 150° C. for 1 hour under a pressure of 50,000 to 150,000 Pa is 5 weight % or less.

25. The composite material for electrode as claimed in claim 19, wherein the halogen content is 1 weight % or less.

26. The composite material for electrode as claimed in claim 19, wherein the content of alkali metal, alkali earth metal and/or rare earth metal is 0.5 weight % or less.

27. The composite material for electrode as claimed in claim 19, wherein the ionic compound content is 1 weight % or less.

28. The composite material for electrode as claimed in claim 19, wherein the weight average molecular weight of the absolute molecular weight of the polymer having a quinoxaline structural unit represented by formula (1):

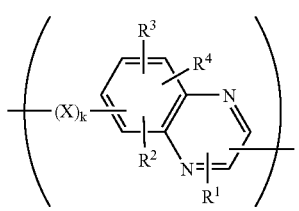

(1)

(wherein $R^1$ to $R^4$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) measured by a light scattering method is 5,000 or more.

29. The composite material for electrode as claimed in claim 19, wherein the proportion of the polymer having a quinoxaline structural unit represented by formula (1):

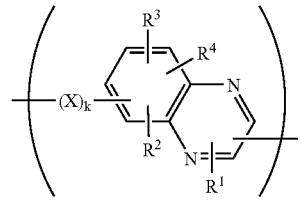

(1)

(wherein $R^1$ to $R^4$, which may be the same or different, each independently represents a hydrogen atom, a halogen atom, a hydroxyl group, an alkyl group having from 1 to 20 carbon atoms which may have a heteroatom, an alkenyl group having from 2 to 20 carbon atoms, an alkynyl group having from 2 to 20 carbon atoms, an aryl group which may have a substituent, a carboxylic acid or carboxylic acid ester group having from 1 to 20 carbon atoms, a nitro group, or a sulfonic acid or sulfonic acid ester group, $R^1$ to $R^4$ each may have a linear, branched or cyclic structure; X represents a heteroatom alone or an aryl group having from 2 to 20 carbon atoms which may have a heteroatom; and k represents an integer of 0 to 5) with a weight average molecular weight of the absolute molecular weight of less than 1,000 measured by a light scattering method is 5 weight % or less.

30. An electrode comprising the composite material for electrode as claimed in claim 19.

31. A battery electrode comprising the composite material for electrode as claimed in claim 19.

32. The electrode as claimed in claim 30, wherein the electrode density is 0.7 g/cm³ or more.

33. A method for producing the electrode as claimed in claim 30, comprising molding at a temperature range of 150 to 500° C. under a pressure of 100 to 2,000 kg/cm².

34. A battery comprising the electrode as claimed in claim 30.

35. A secondary battery comprising the electrode as claimed in claim 30 for its negative electrode, a positive electrode and an electrolyte, wherein the positive electrode and/or the negative electrode performs a charge/discharge reaction by the insertion/release of a proton and the electrolyte has proton conductivity.

36. The secondary battery as claimed in claim 35, wherein the electrolyte is a proton-conductive solid and/or gel electrolyte.

37. The secondary battery as claimed in claim 35, wherein the electrolyte is a sulfuric acid solution having a concentration of 10 to 50 weight %.

38. The secondary battery as claimed in claim 35, the amount of an inorganic fine particle contained in the electrolyte is within a range of 0.1 to 50 weight %.

* * * * *